Aug. 30, 1966    M. B. LUCAS    3,269,516
SHEET TURNING MECHANISM
Filed April 13, 1965    3 Sheets-Sheet 1

INVENTOR.
Malcolm B. Lucas
BY Fredrick H. Braun
ATTORNEY

Aug. 30, 1966  M. B. LUCAS  3,269,516
SHEET TURNING MECHANISM
Filed April 13, 1965  3 Sheets-Sheet 2

INVENTOR.
Malcolm B. Lucas
BY *Frederick H. Braun*
ATTORNEY

Aug. 30, 1966  M. B. LUCAS  3,269,516
SHEET TURNING MECHANISM
Filed April 13, 1965  3 Sheets-Sheet 3
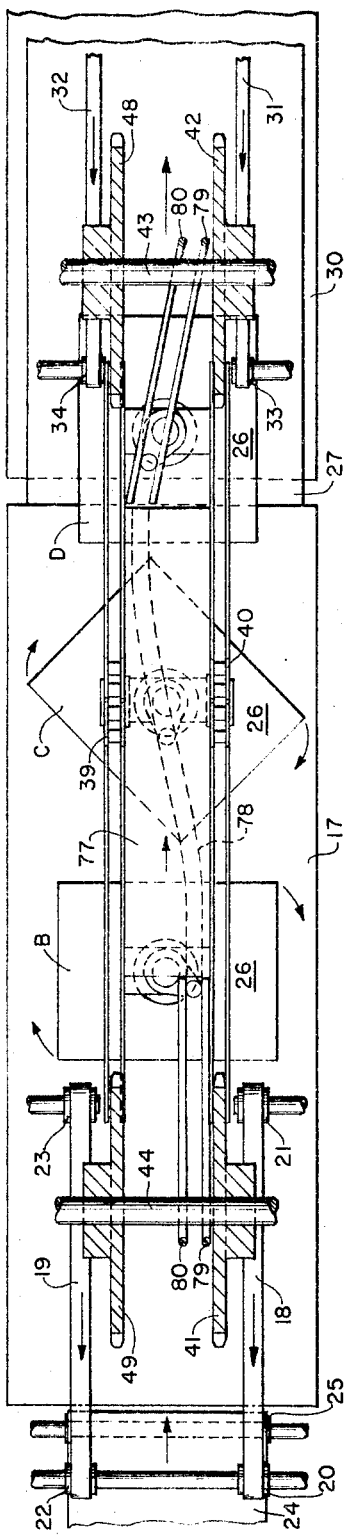
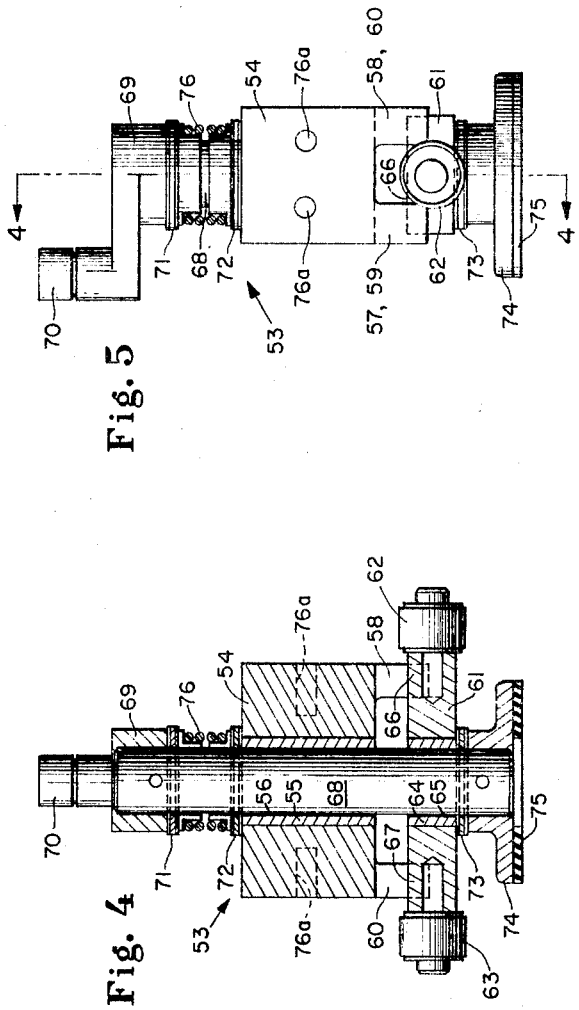
INVENTOR.
Malcolm B. Lucas
BY Fredrick H. Braun
ATTORNEY

United States Patent Office 3,269,516
Patented August 30, 1966

3,269,516
SHEET TURNING MECHANISM
Malcolm B. Lucas, Cincinnati, Ohio, assignor to The Procter & Gamble Company, Cincinnati, Ohio, a corporation of Ohio
Filed Apr. 13, 1965, Ser. No. 447,680
5 Claims. (Cl. 198—33)

The present invention relates to an apparatus for turning sheet material. More particularly, the invention contemplates an apparatus for receiving and thereafter turning a moving sheet or pad in its own plane as it is moved through the turning station.

In the manufacture of articles of flexible sheet material on high speed equipment, it is usually considered more desirable and much simpler to perform folding and/or gluing steps on longitudinal edges of the sheet with respect to its path of travel through the machine rather than on its lateral edges. After performing these steps on the longitudinal edges, it is desirable to rotate the article through a sufficient angle so that the remaining edges successively are moved into a position wherein they move longitudinally with respect to the path of travel of the article. This theory dictates the need for a device to turn flat polygonal articles through a substantial angle while the articles are in motion. For example, in the manufacture of disposable diapers of the type described and claimed in U.S. Patent 3,180,335 issued to Robert C. Duncan et al. on April 27, 1965, said patent being commonly owned by the assignee of the present invention, a plurality of layers of creped cellulose wadding are enclosed by a top sheet of either paper or a non-woven fabric. The four edges of the top sheet are folded over and adhered to the superposed wadding sheets in order to complete the structural fabrication of a disposable diaper pad. In the course of doing this, the superposed plies of wadding and the top sheet are moved along in the machine so that the two longitudinally disposed edges (with respect to the direction of movement) of the top sheet are folded over and adhered. Initially, the remaining edges are laterally disposed to the direction of motion. Therefore, the pad must be rotated 90° in order to position the pad for final folding and adhering of the top sheet.

The above objects were accomplished by a turning mechanism as described and claimed in the earlier application of Malcolm B. Lucas, Serial Number 234,474, filed October 3, 1962, now Patent No. 3,189,158, said application being commonly owned by the assignee of the present invention. The present invention is believed to represent an improvement in certain respects over the said earlier application in that it provides a positive means for causing engagement between the turning head of the turning mechanism and the successive pads being turned.

For convenience, the present invention will be described in terms of its operation in connection with diaper pads of the tpye heretofore described. It will be understood, however, that the utility of the invention is not limited to this particular type of product. It can be used with comparable effectiveness on sheets of paper or other types of sheet material that are handled in similar fashion. Thus, whenever the term "diaper pad" is used in the ensuing description, it will be understood to be broadly inclusive of a sheet of material regardless of its intended use.

An object of the present invention is the provision of a mechanism for receiving a moving diaper pad or the like and rotating same in its plane of movement through the apparatus in order that the pads will be in proper orientation for further manufacturing steps.

A further object of the invention is the provision of a turning mechanism of the character described which includes means for precisely controlling and for positioning of the turning head in relation to the pad at the time the turning head engages the pad.

Another object of the invention is the provision of a turning mechanism of this character which is relatively simple and inexpensive and yet is very reliable in operation so that it will not affect the efficiency and performance of associated machinery components.

The nature and substance of the invention can be briefly summarized as comprising a turning head mounted for movement in a supporting body or block and having a flat surface at one end, the entire assembly being carried in a preferably circuitous path by a pair of carrier chains and a polished platform or dead plate mounted for receiving successive pads of material. As the turning head approaches the dead plate in timed relation to the arrival of a pad at such plate, it is positively actuated and moved downwardly to contact the pad received on the dead plate, thereafter continuing to move the pad forward across the dead plate without any substantial change in speed. As the turning head is moved forward, it remains in contact with the pad. Simultaneously, the bottom surface of the turning head is rotated causing equivalent limited rotation of the pad. The turning head continues its forward movement in contact with the pad for a short period after completion of pad rotation. Thereafter the turning head is raised to break contact with the pad. The pad is delievered before contact is broken to a take-away conveyor which receives the turned pad and carries it away from the turning mechanism.

While the specification concludes with claims particularly pointing out and distinctly claiming the subject matter regarded as forming the present invention, it is believed the invention will be better understood from the following description taken in connection with the accompanying drawings in which:

FIGURE 3 is a fragmentary plan view partially in cross section taken on the line 3—3 of FIGURE 1 showing the turning cam and several turning heads as they move through the turning cycle.

FIGURE 4 is a side elevation in cross section taken on the line 4—4 of FIGURE 5 showing the structural details of one turning head.

FIGURE 5 is a front elevation of the turning head shown in FIGURE 4.

Figure 1:
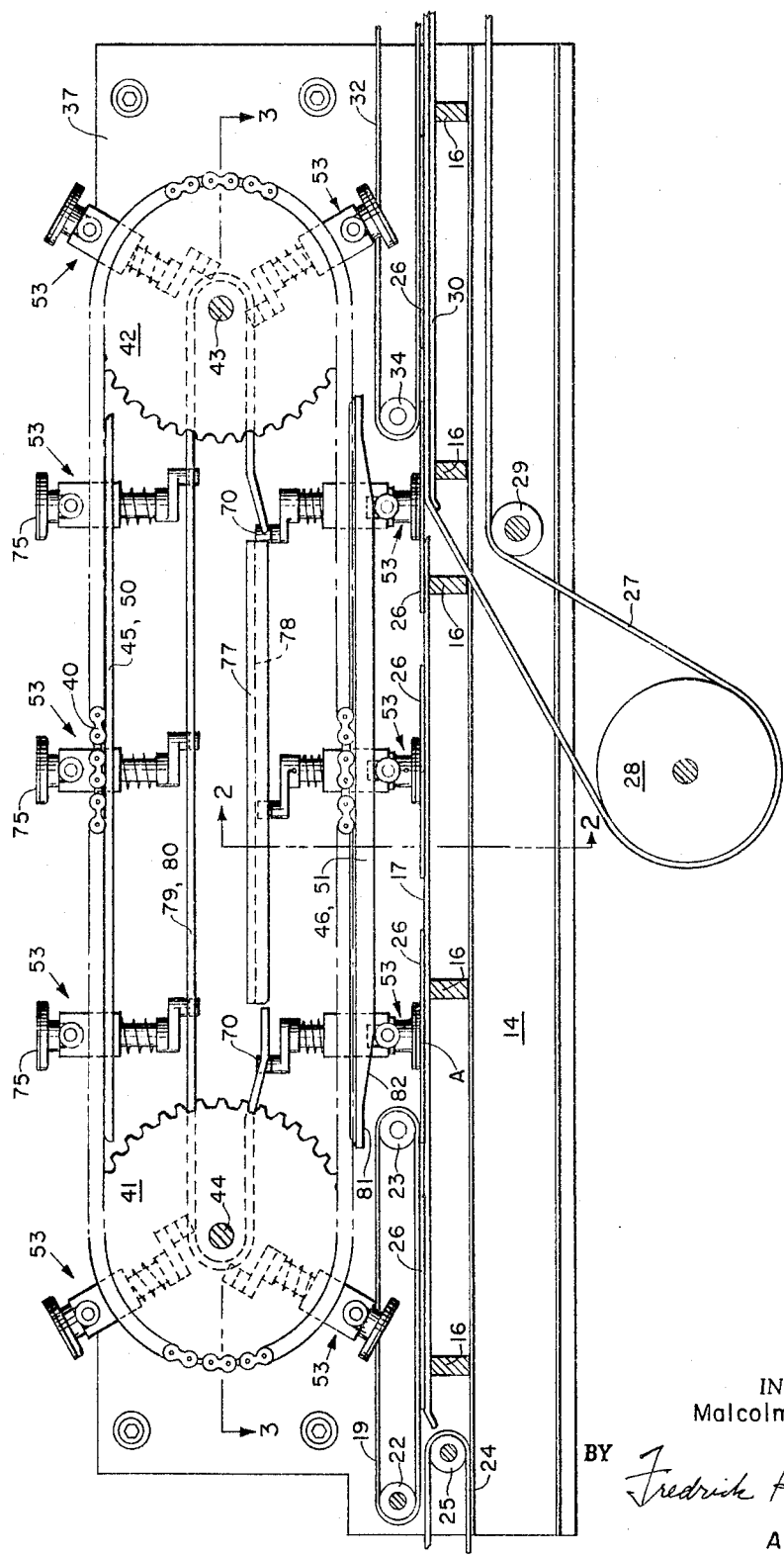
FIGURE 1 is a fragmentary longitudinal elevation, partially in cross section, taken on the line 1—1 of FIGURE 2 illustrating several turning heads together with the carrier chains and supports for moving the turning heads in a circuitous path.
Figure 2:
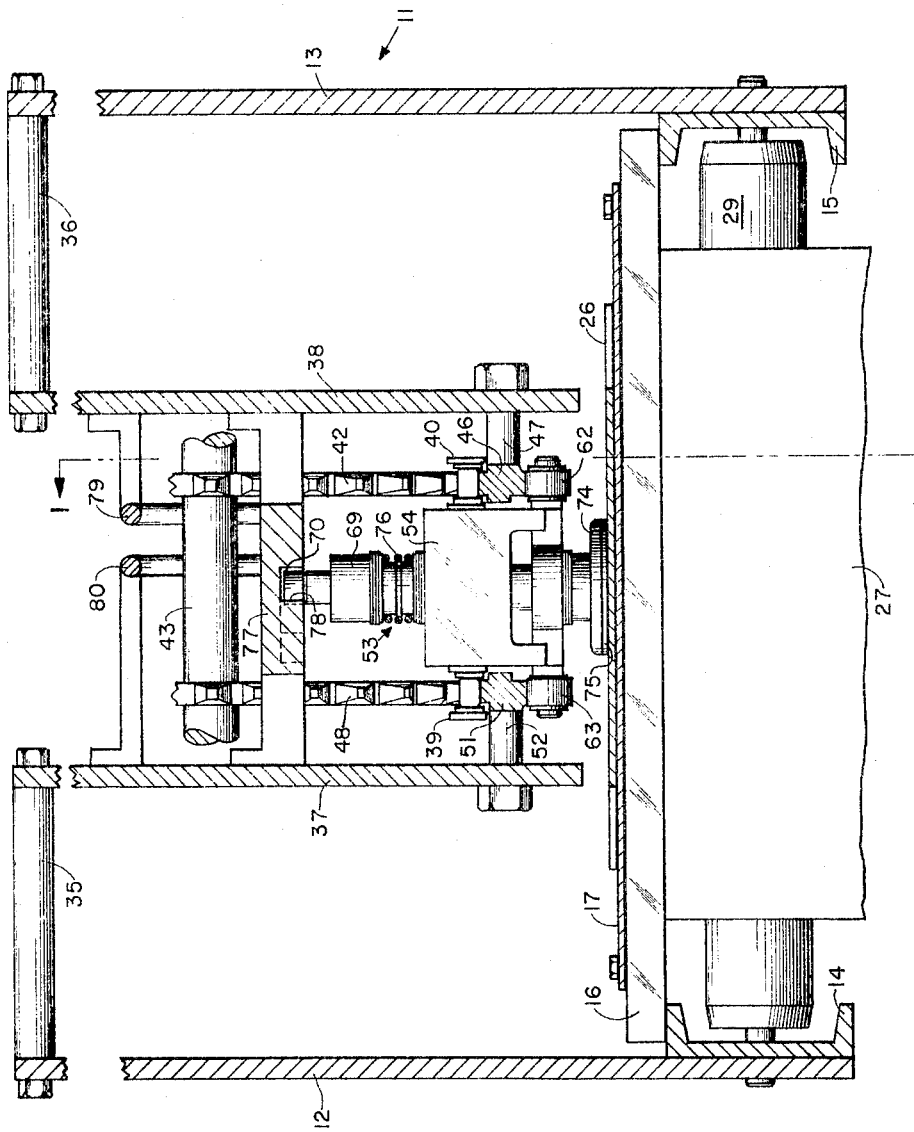
FIGURE 2 is a fragmentary lateral elevation in cross section taken on the line 2—2 of FIGURE 1 showing a turning head and associated structure.

Referring now to the structure of the device as illustrated more particularly in FIGURES 1 and 2, a frame 11 is provided which consists of side plates 12 and 13, channel members 14 and 15 and a plurality of cross supports 16. A highly polished platform or dead plate 17 rests upon and is secured to several of the cross supports 16 illustrated in FIGURE 1.

Forwarding belts 18 and 19 (see also FIGURE 3) are suitably supported in laterally spaced parallel relationship by conventional pulleys and are driven in unison. The pulleys 20 and 21 support the forwarding belt 18 and the pulleys 22 and 23 support the forwarding belt 19. A wide lower delivery belt 24 supported at one end by the pulley 25 cooperates with the belts 18 and 19 to move the pads 26 forward in single file order to deliver them in slightly spaced relation at the leading end of the dead plate 17.

A take-away conveyor is provided at the other end of the frame. The take-away conveyor is composed of a lower carrier belt 27 supported at one end by the pulley 28 and running over an idler pulley 29 and a support plate 30. As illustrated in FIGURES 1 and 3, upper take-away conveyor belts 31 and 32 are supported by the pulleys 33 and 34, respectively. The belts 31 and 32 are driven substantially at the same speed as the carrier belt 27 to receive the pads 26 from the turnaround device and to convey them away from the turning mechanism.

The turning mechanism will be explained by reference to FIGURES 1 and 2. The tie rods 35 and 36 support a pair of spaced hanger plates 37 and 38 in suspended relation over the dead plate 17 as best illustrated in FIGURE 2. Endless carrier chains 39 and 40 are appropriately supported in spaced relationship for continuous movement in a circuitous path.

Referring first to FIGURE 1, the carrier chain 40 is mounted to run over the sprockets 41 and 42 which are appropriately supported from the hanger plates 37 and 38. FIGURE 2 illustrates a shaft 43 which supports the sprockets 42. The sprocket 41 is similarly supported by a shaft 44 (FIGURE 1). An upper track 45 suitably supported from the hanger plate 38 supports the upper flight of the chain 40. The lower flight is supported on the top of the cam 46 which is suitably supported by tie rods 47 from the hanger plate 38.

Similarly, the carrier chain 39 travels over the sprockets 48 and 49 which are also supported on the shafts 43 and 44, respectively. As viewed in FIGURE 1, the sprocket 49 lies directly behind the sprocket 41 and the sprocket 48 lies directly behind the sprocket 42 (see also FIGURE 3). Thus, the chains 40 and 39 are parallel throughout their path of travel and lie in the same projected plane as viewed in FIGURE 1. An upper track 50 lying directly behind the upper track 45 is provided for the chain 39. The lower flight of the chain 39 is supported on the top of the cam 51 (FIGURE 2) which is suitably supported by the rods 52 from the hanger plate 37.

A plurality of turning heads 53 are mounted on the carrier chains 39 and 40 at spaced intervals therealong. As illustrated in FIGURE 4, each turning head 53 is composed of a journal block comprising a body 54 having a bushing 55 fitted therein. The bushing 55 has a bore 56 therein. Guides 57 and 58 (FIGURE 5) extend downward on one side of the body 54. A similar pair of guides 59 and 60 is provided on the other side of the body. A follower support 61 has cam followers 62 and 63 mounted for free rotation at its outer ends. The follower support 61 is fitted with a bushing 64 having a bore 65 therein. The support 61 includes a guide portion 66 adapted for sliding movement between the guides 57 and 58. Similarly, the guide portion 67 is slidable between the guides 59 and 60.

A turning member or shaft 68 is slidable and rotatable in the bores 56 and 65. A crank 69 with a cam follower 70 is pinned to the upper end of the shaft 68. Thrust bearings 71, 72 and 73 are provided as shown. A turning foot 74 is secured to the shaft 68. Foot 74 has a flat lower surface 75 formed by means of a rubber pad or its equivalent and having a relatively high coefficient of friction. The coil spring 76 normally urges the shaft 68 upwardly with respect to the body 54. It will be seen that rotation of the crank 69 will cause an equivalent degree of rotation in the foot 74. It will also be apparent that the foot 74 can be moved up or down in the bore 56 as by pushing down on the cam followers 62 and 63. In addition, the follower support 61 is not capable of turning with respect to the body 54 although it can be moved up or down with respect thereto.

Holes 76a are provided in the body 54. These holes are used to mount the turning head 53 between the chains 39 and 40 as by the use of suitable pins or the like. Referring to FIGURE 1, it will be noted that a plurality of turning heads 53 are mounted in spaced relationship for travel in a circuitous path.

Referring again now to FIGURES 1, 2 and 3, a turning cam 77 is provided and suitably supported from the hanger plates 37 and 38. As illustrated in FIGURE 3, the turning cam 77 is provided with a groove 78. The cam followers 70 on each successive turning head 53 enters the groove 78 as it moves through that portion of its path of travel. A reset device is also provided as best illustrated in FIGURES 1 and 3. The reset device is also supported from the hanger plates 37 and 38 and consists of parallel rods 79 and 80 which are equally spaced throughout their length. The rods 79 and 80 are so spaced that the cam followers 70 enter therebetween as they leave the groove 78 in the cam 77. The followers 70 are retained between the rods 79 and 80 throughout their remaining path of travel. This provides a positive return for the foot elements 74 on each turning head 53 until the follower 70 again enters the groove 78 in the cam 77.

A positive camming device is provided to insure proper timing and position of each turning head 53 when actuated into contacting engagement with the successive diaper pads 26. This consists of the cams 46 and 51 as illustrated in FIGURES 1 and 2. When the turning head is about to contact a pad, the cam followers 62 and 63 move under the leading end of the cams 46, 51 as at 81 in FIGURE 1. As the turning head 53 continues forward, the foot 74 moves downwardly with respect to the body 54 since the chains 39, 40 ride on the upper part of the cams 46, 51 and the cam followers 62, 63 are forced down by the slope 82 of the cams 46, 51 until the lower face of the high friction surface 75 engages a pad 26 at approximately the point A shown in FIGURE 1. The positive action of the cams 46, 51 on the downward movement of each foot 74 of each turning head 53 makes certain that the pad 26 is contacted when the forward velocity of the pad 26 and the turning head 53 are matched. This maintains accurate control of the position of successive turning heads 53 with successive pads 26.

The manner in which the apparatus operates to turn pads will now be described. The pads 26 are delivered to the turning mechanism in spaced relation by the belts 18, 19 and 24 and are moved onto the polished surface of the dead plate 17. Carrier chains 29 and 40 move a turning head 53 into position in timed relation to the delivery of each pad. As the lower surface 75 of the turning head 53 is lowered by the cams 46, 51, it engages the approximate center of the pad 26 (point A in FIGURE 1). The turning head 53 is moving at about the same speed as the belts 18, 19 and 24, and therefore engages the pad 26 and carries it forward on the dead plate after it has been released by the belts. The initial position of the turning head 53 and the pad 26 is shown at B in FIGURE 3.

As the turning head 53 continues to move forward, the cam follower 70 enters the groove 78 of the turning cam 77. This causes rotation of the shaft 68 and its associated elements including the high-friction surface 75 thereby turning the pad 26 as it moves across the polished dead plate 17. Positions C and D in FIGURE 3 illustrate several intermediate positions of the pad 26 as it is turned through an angle of about 90° while the cam 70 of the turning head 53 is moved through the turning cam 77. It will be understood, of course, that the device can be modified to turn the pad 26 through more or less than 90° merely by changing the length and/or the shape of the groove 78.

After the pad 26 has been turned through the desired arc, it is delivered to the lower carrier belt 27 and is held thereon by the belts 31 and 32. The spring 76 causes the foot 74 to raise as the followers 62 and 63 follow the shape of the trailing end of the cams 46, 51. This causes the friction surface 75 to raise and lose contact with the pad 26. As the turning heads 53 continue to move, the cam follower 70 enters the track formed by the rods 79 and 80 (see FIGURE 3). This returns the foot member 74 and the friction surface 75 to their original position as the turning head 53 moves through the remainder of its path so that it is in readiness for the next turning operation when it again approaches the cams 46, 51.

It will be understood that any number of turning heads 53 can be secured to the carrier chains 39 and 40 depending upon the needs of any particular operation. While ten have been illustrated in FIGURE 1, this number can be decreased or increased to any desired value without in any way affecting the operation of the invention.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. Apparatus for turning a moving sheet received from a delivery source, said apparatus comprising a polished dead plate onto which said sheets are delivered, a conveyor, a journal block mounted on said conveyor, a turning member supported in said block for rotative movement about its axis and limited axial movement relative to said block, said turning member having at one end a flat surface with a high coefficient of friction compared to said polished plate, means normally urging said member to position said one end proximate said block, means maintaining the portion of said conveyor extending over said polished dead plate a distance such that said flat surface is spaced from said plate when normally urged to said position proximate said block, means positively moving said turning member axially toward said plate to cause said flat surface to engage any sheet thereon as said turning member reaches said plate and for subsequently releasing the member for return to normal position, and means for rotating said flat surface a predetermined number of degrees while in engagement with said sheet.

2. Apparatus for turning a moving sheet received from a delivery source, said apparatus comprising a polished deadplate onto which said sheets are delivered, a conveyor, a journal block mounted on said conveyor, a turning member supported for axial and rotative movement in said journal block, said turning member having a flat surface at one end, said flat surface having a high coefficient of friction compared to said polished plate, means normally urging said member to position said one end proximate said block, means including a conveyor support member for maintaining the portion of said conveyor extending over said polished dead plate a distance such that said flat surface is spaced from said plate when normally urged to said position proximate said block, means positively moving said turning member axially toward said plate to cause said flat surface to engage any sheet thereon as said turning member reaches said plate and for subsequently releasing the member for return to normal position, and means for rotating said flat surface a predetermined numbe of degrees while in engagement with said sheet.

3. Apparatus for turning a moving sheet received from a delivery source, said apparatus comprising a polished dead plate onto which said sheets are delivered, a conveyor, a journal block mounted on said conveyor, a turning member supported for axial and rotative movement in said journal block, said turning member having a flat surface at one end, said flat surface having a high coefficient of friction compared to said polished plate, means normally urging said member to position said one end proximate said block, means including a conveyor support member for maintaining the portion of said conveyor extending over said polished dead plate a distance such that said flat surface is spaced from said plate when normally urged to said position proximate said block, a stationary cam, a cam follower supported by and extending from said turning member, said cam follower being guided by said stationary cam to positively move said turning member axially toward said plate to cause said flat surface to engage any sheet thereon as said turning member reaches said plate and for subsequently releasing the member for return to normal position, and means for rotating said flat surface a predetermined number of degrees while in engagement with said sheet.

4. Apparatus for turning a moving sheet received from a delivery source, said apparatus comprising a polished dead plate onto which said sheets are delivered, a conveyor comprising a pair of spaced parallel endless chains supported over said dead plate, a journal block mounted between said chains, a turning member supported for axial and rotative movement in said journal block, said turning member having a flat surface at one end, said flat surface having a high coefficient of friction compared to said polished plate, means including a spring for normally urging said member to position said one end proximate said block, means including a conveyor support member for maintaining the lower portion of said endless chains extending over said polished dead plate a distance such that said flat surface is spaced from said plate when normally urged to said position proximate said block, a stationary cam supported from said conveyor support member, at least one cam follower supported by and extending from said turning member, said cam follower being guided by said stationary cam to positively move said turning member axially toward said plate to cause said flat surface to engage any sheet thereon as said turning member reaches said plate and for subsequently releasing the member for return to normal position, and means for rotating said flat surface a predetermined number of degrees while in engagement with said sheet.

5. Apparatus for turning a moving sheet received from a delivery source, said apparatus comprising a polished dead plate onto which said sheets are delivered, a conveyor comprising a pair of spaced parallel endless chains supported over said dead plate, a plurality of journal blocks suspended between said chains for movement therewith, a turning member supported for axial and rotative movement in each of said journal blocks, each of said turning members having a flat surface at one end, each of said flat surfaces having a high coefficient of friction compared to said polished plate, means including a spring for normally urging each of said members to position said one end proximate its said block, means including a conveyor support member for maintaining the lower portion of said endless chains extending over said polished dead plate a distance such that said flat surfaces are spaced from said plate when normally urged to said position proximate its said block, a stationary cam supported from said conveyor support member, at least one cam follower supported by and extending from each of said turning members, said cam followers being guided by said stationary cam to positively move each successive turning member axially toward said plate to cause said flat surfaces to engage successive sheets thereon as successive turning members reach said plate and for subsequently releasing successive turning members for return to normal position, and means for rotating each of said flat surfaces a predetermined number of degrees while in engagement with a sheet.

References Cited by the Examiner
UNITED STATES PATENTS 1,765,419   6/1930   Goss _____ 93—33 X
3,189,158   6/1965   Lucas _____ 198—33

EVON C. BLUNK, *Primary Examiner.*

M. L. AJEMAN *Assistant Examiner.*